US008538087B2

(12) United States Patent
Minoni et al.

(10) Patent No.: US 8,538,087 B2
(45) Date of Patent: Sep. 17, 2013

(54) AIDING DEVICE FOR READING A PRINTED TEXT

(75) Inventors: Umberto Minoni, Brescia (IT); Mauro Bianchi, Brescia (IT)

(73) Assignee: Universita' Degli Studi di Brescia, Brescia (IT)

( * ) Notice: Subject to any disclaimer, the term of this patent is extended or adjusted under 35 U.S.C. 154(b) by 0 days.

(21) Appl. No.: 13/002,001

(22) PCT Filed: Jul. 8, 2009

(86) PCT No.: PCT/IB2009/052971
§ 371 (c)(1),
(2), (4) Date: Feb. 3, 2011

(87) PCT Pub. No.: WO2010/004515
PCT Pub. Date: Jan. 14, 2010

(65) Prior Publication Data
US 2011/0188783 A1      Aug. 4, 2011

(30) Foreign Application Priority Data
Jul. 10, 2008   (IT) .............................. BS2008A0133

(51) Int. Cl.
*G06K 9/00*     (2006.01)

(52) U.S. Cl.
USPC ............ 382/114; 382/117; 382/182; 382/313

(58) Field of Classification Search
USPC .......................... 382/114, 177, 182, 313, 117
See application file for complete search history.

(56) References Cited

U.S. PATENT DOCUMENTS
6,115,482 A * 9/2000 Sears et al. .................... 382/114

FOREIGN PATENT DOCUMENTS
WO            99/21122       4/1999

* cited by examiner

*Primary Examiner* — Wesley Tucker
(74) *Attorney, Agent, or Firm* — Shoemaker and Mattare

(57) ABSTRACT

The invention deals with an aid device for reading a printed text, comprising a data acquisition peripheral with a camera and a communication interface, said peripheral being movable by a user on a printed text to frame a portion of text, a processing unit, communication means between the peripheral and the processing unit, and a vocal reproduction device. The processing unit is programmed to acquire a sequence of images framed by the camera, to detect when the user has stopped on the text, to recognize at least one word which the user intends reading, and to reproduce the sound of said at least one word by means of vocal synthesis by means of the vocal reproduction device.

18 Claims, 7 Drawing Sheets

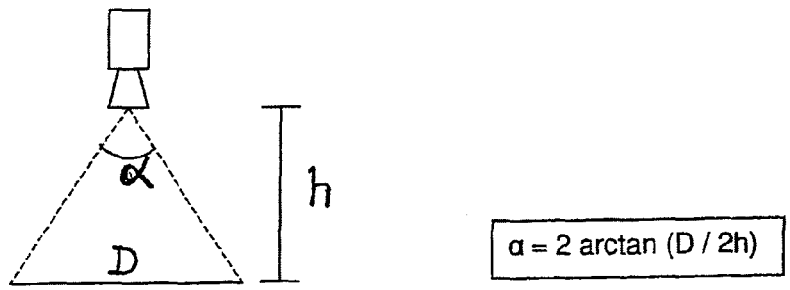
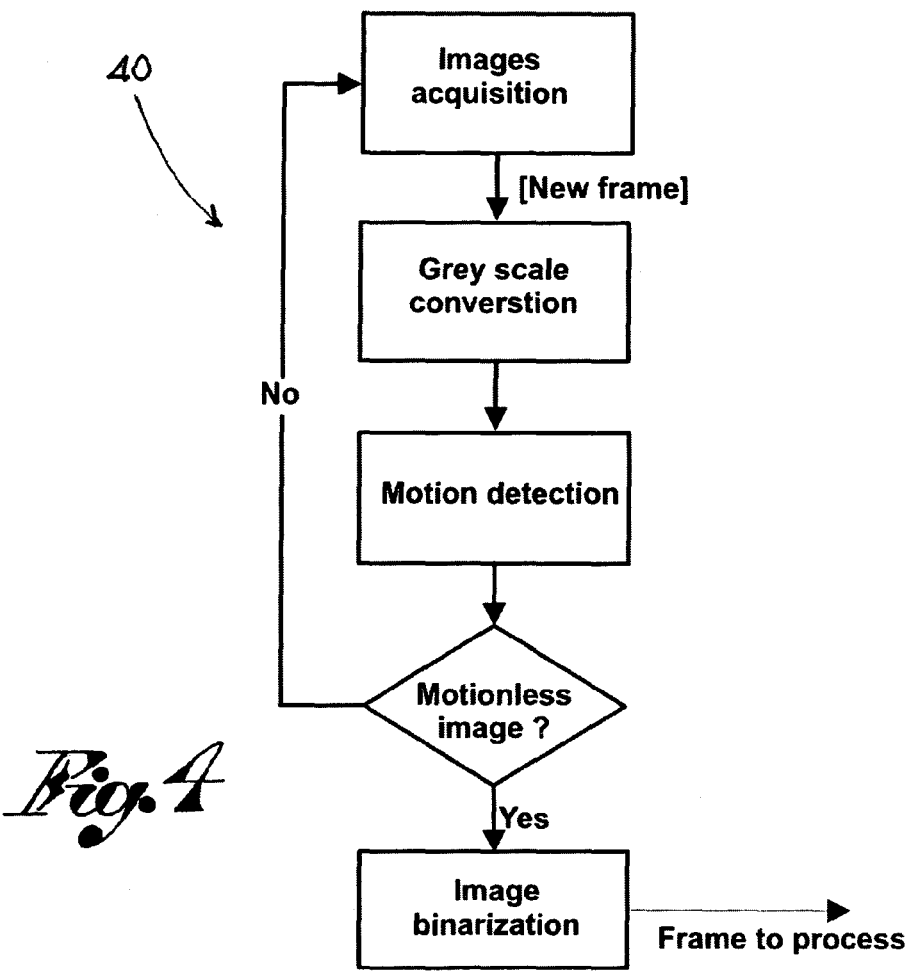

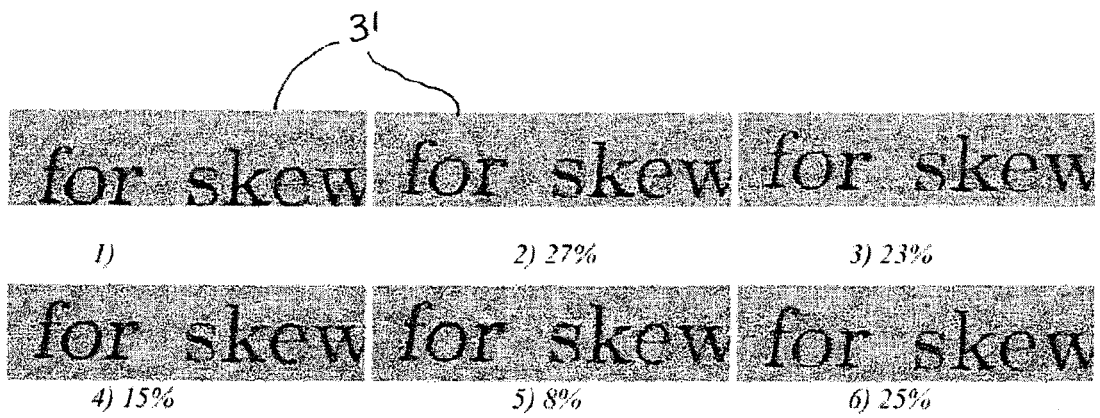
Fig.5
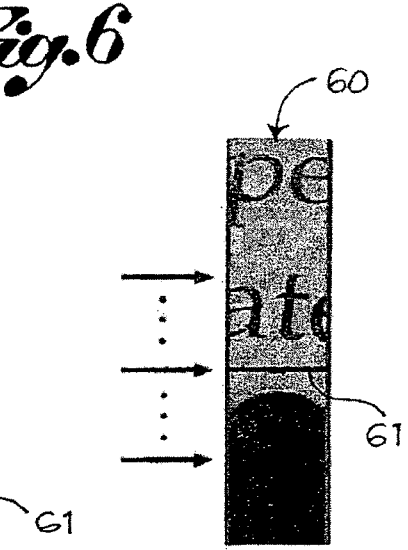
Fig.6
Fig.7

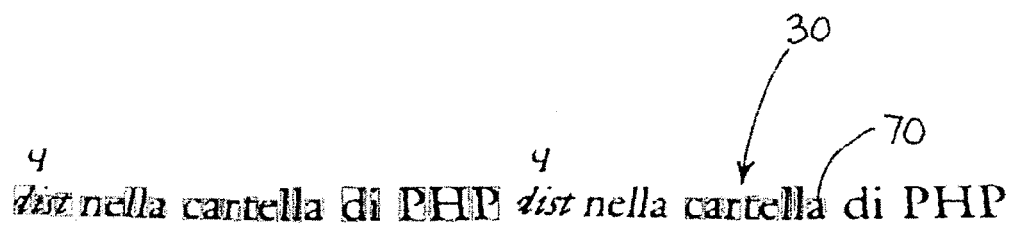
Fig.16a  Fig.16b
Fig.17

AIDING DEVICE FOR READING A PRINTED TEXT

The subject of the presented invention is a reading aid device, specially suited for dyslexic people.

Dyslexia is a learning disability that manifests itself as a difficulty in reading accurately/fluently and also reveals poor writing abilities. Dyslexia is a linguistic issue and not a visual issue. The disability is located in the phonological module of the language that is the part of the brain that joins the phonemes together to form words. The dyslexic children show an evident difficulty in the translation of the written text in spoken text. The reading task is composed of a first identification of the written words, followed by a subsequent text comprehension. Dyslexia affects only the first stage of this process and not the comprehension and reasoning abilities, which are however influenced by the success of the first reading step.

In addition to the several specific computer programs with didactic and rehabilitative aims, there are some software utilities that allow making the reading task easier. The didactic software can be considered a valid option to the study on paper support: the software enables an "explicit" learning, where textual content is directly shown and not only described. Furthermore there is the possibility to reinforce the message effectiveness through the synergy of the different communication channels. This synergy make the learning more easy because it involves different channels and through these channels it is possible to recover what have been learned. The software tools can be used for educational, rehabilitative and therapeutic purposes. In case the reading task is not avoidable, it is possible to use a speech synthesis, which reads the text in place of the dyslexic child. Through a scanner, even the paper documents can be acquired and transformed in digital texts thanks to the OCR software usually provided with the scanner itself.

For example, "Audioscan" by Audiologic, which is an optical characters recognition system with speech synthesis, allows importing textual documents with a scanner and reading them with a speech synthesis engine. In this manner it is possible to make the computer read newspapers, books, etc.

If digital documents are available (e.g. electronic books), software with speech synthesis like "DocReader" can read them, underlining the words which are spoken to guide the user during the reading task.

Another useful software aid is "Read And Write" produced by "TextHelp" which can read the letters and words written or selected by the user during the interaction with the usual word processing or web surfing utilities. The software tool also helps the user to complete the words he is writing thanks to a word prediction system: the user can choose between one of the proposed options and hear the corresponding vocal reproduction.

Known the effectiveness of the software tools, which read the written text with speech synthesis, this way has been followed, but with a different approach.

The aim is to give to the dyslexic user the same advantages of an electronic book with speech synthesis like "DocReader", but with the possibility to interact with any printed-paper document.

In particular, the purpose of this invention is to propose a reading aid device, which allows the dyslexic person to read the same books and newspapers of his mates; a practical, intuitive, easy to handle device of small size.

These purposes are obtained with a device comprising a video acquisition peripheral with a camera and a communication interface, said peripheral being movable by a user on a printed text to focus on a portion of text, a processing unit, communication means between the peripheral and the processing unit, and a vocal reproduction device.

The processing unit is programmed to acquire a sequence of images framed by the small camera, to detect when the user has stopped on the text, to recognise at least one word which the user intends reading, and to reproduce the sound of said at least one word by means of vocal synthesis through the vocal reproduction device.

According to a preferred embodiment, the acquisition peripheral can be fastened to a pointer that can be gripped by the user to be rested close to a word to be read, said peripheral being mounted on the pointer in a position such as to frame at least the word to be read without impeding the view of the user and without hindering the pointer grip.

Advantageously, the acquisition peripheral has an arm that can be fastened to a common pen or pencil.

Unlike existing systems, which need the scanning of an entire document or of a complete sentence and an extreme pointing precision, the proposed device allows an easy reading, controlled directly by the user.

Indeed, the device of the proposed invention is set up like a portable instrument which guides the user during the reading, reproducing locally and by request the words to decode, eventually forcing the repeat of the more difficult ones.

It must be stressed that, with the use of the proposed device, the dyslexic user which normally scans the text being read, can be given an help in the reading of a word he is not able to decode, just stopping the pointer for a short time below that word It is not required the purchase of additional software or electronic books because the user, with the proposed device, can read any existent printed text.

It is worth noting that the device, according to the invention, is a reading aid and support that facilitates the user recognizing the written words; the device can be integrated in the usual reading learning programs, and should not substitute them. The dyslexic child can make use of the instrument to decode the words that he is not able to read; the instrument have to be considered a support to be used when needed and not just a mean to avoid the reading effort.

The proposed device has the aim to give the dyslexic child an effective reading aid, making easy the process of word's recognition and synthesis. The device is a portable instrument with a camera, which allows the user to recognize portions of written text and to reproduce them. The user easily handles the device, points the word to be read and listen to its vocal reproduction. The target is to motivate the learning to read, exploiting visual and auditory stimulations together.

Further features and advantages of the device according to the invention will be explained in the following description of preferred embodiments thereof, with reference to the attached drawings, wherein:

FIG. 1 schematically shows the device according to the invention in a general embodiment;

FIG. 2 is a sketch used for the calculation of the camera optics;

FIG. 4 is a flow diagram of the pre-processing algorithm applied to a sequence of images;

FIG. 5 shows a sequence of images which give an indication of the motion level of the acquisition peripheral;

FIGS. 6 to 10 represent corresponding steps of the images pre-processing algorithm, in particular the binarizarion method;

FIGS. 13 to 17 represent corresponding steps of the words extraction algorithm.

Figure 1:
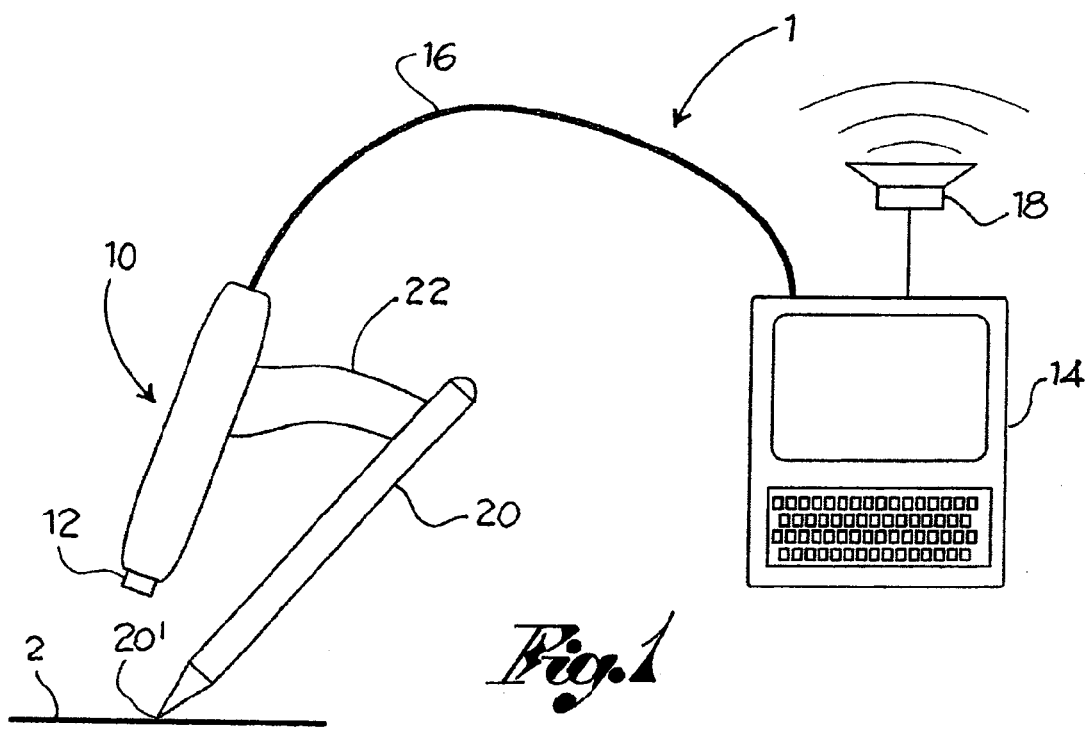

Referring to the above said figures, the reading aid device for printed texts, according to the invention, has been indicated with 1.

According to a general embodiment, the device 1 comprises an acquisition peripheral 10 provided with a mini camera 12 and a communication interface. The peripheral 10 is a portable device, so being movable by the user over a printed text 2 to frame a portion of text 3.

The device 1 includes also a processing unit 14, communication means 16 between the peripheral 10 and the processing unit 14, and a vocal reproduction device 18.

The processing unit 14 is programmed to capture a sequence of images framed by the mini camera 12, to detect when the user has stopped on the text, to recognize at least one word that the user intends reading, and to reproduce the sound of said at least one word by the means of vocal synthesis through the vocal reproduction device 18.

According to a preferred embodiment, the acquisition peripheral 10 is suitable for being fastened to a pointer 20 gripped by the user to be rested close to a word to be read. In particular, the peripheral 10 is mounted on the pointer 20 in a position such as to frame at least the word to be read without impeding the view of the user and without hindering the pointer grip 20.

Advantageously, the acquisition peripheral 10 has an arm 22 that can be fastened to a common pen or pencil 20 acting as a pointer.

Considering the previously defined targets, it is clear that the device should have a small size, should be easily handled by the user and should be used in an intuitive and practical manner. In particular the device should be gripped like a pen and should allow the user to point the desired word with a large tolerance in terms of pointing angle and of distance from the printed text. In fact, the constraints on the way and on the orientation the device can be handled with by the user should not be too restricting and the system has to correctly work even in case of an approximate pointing of the word to read.

The activities that the child should be able to do are to follow the text to scan with this sort of "electronic pen", to stop on the wanted word, and to listen to the word vocal reproduction. To guide and to help the child during the pointing activity, the device has been equipped with a pointer 20 to be rested below the text to be recognized. In this way the user can follow the text with the pen and stop the pointer near the desired word to enable the recognizing and the speech synthesis. This approach is useful both from the point of view of the user and the point of view of the designer, who finds more stable images that simplify the algorithms for text recognition. The pen tip position (hereafter called "marker" 24) in the image is an useful information for the word extraction and recognition algorithms, since the pen tip position provides a starting point for the text search as better explained later on.

Moreover, advantageously, it is possible to activate the text reproduction automatically when the user stops near the word without the need of further buttons.

As it will be better explained later, the device according to the invention allows to have an extremely low acquisition, processing and reproduction time: the child does not have to wait the speech synthesis of the word, otherwise the device would be ineffective or even useless.

According to one embodiment, the device 1 has a mini camera 12, an image pre-processing and filtering circuit, a serial interface for the connection with a computer 14 that executes the software for text recognition and speech synthesis.

The power supply of the device can be either through the connecting wire or can be autonomous by means of a local battery.

The choice of separating the image processing from the image acquisition allows to avoid realizing the recognition and vocal reproduction on the device, but reusing software already existing for this purpose.

The minimum distance from the sheet where the pen 20 can be placed to maintain the focus of the camera 12 and to enable the camera to acquire the whole word being recognized defines the optics specifications. These can be defined once the acquisition device has been chosen and its technical features are known.

According to a specific embodiment, the peripheral 10 has a basically cylindrical shape, with a height of a few centimetres and a diameter less than one centimetre, and the camera is connected to the pointer by means of a thin arm or appendix, eventually articulated. The camera 12 distances 2-3 centimetres from the sheet.

It is obviously important that the distance is such as to let the user handling and pointing the instrument while maintaining the wrist rested on the sheet and, at the same time, avoiding the device tip to cover the word to scan. The user has to be able to clearly see the pointed word and quickly hear its vocal reproduction. Since the device is handled like a pen and thereof at an angle, it is helpful mounting the camera 12 on the pointer body 20 and not directly on the pen tip, perpendicularly to the sheet being scanned. In this way the camera does not clutter the device tip also allowing to easily acquiring the images, and lowering the image deformations due to the inclination. The possibility to orientate or regulate the camera 12 according to the way the device is gripped can also be evaluated. In this way the user can read the text using a device that does not encumber the reading, does not cover the text and effectively supports the reading activity. Apart from the encumbrance of the camera, which can be placed on the upper part of the pointer, the grip must be studied to result sufficiently ergonomic.

The specifics of the images acquisition system are explained now, focusing on the technical specifications of the camera 12 and of the lens.

For the requirements within the text recognition ambit, a grey scale sensor is well suited.

As the choice of the sensor resolution, the problems about image sampling, minimum and maximum size of the text to be read and maximum length of the words have to be taken into account.

Considering that in a normal printed text the stroke width of the characters is about 0.3-0.4 mm and taking into account the sampling constraints, it is possible to estimate the required number of dots for inch (dpi). Given the minimum stroke width w0, a sampling having a spacing of w0/3 can be considered enough.

This is a restricting specification that is not always needed, also because the sampling step is strongly dependent on the features of the OCR (Optical characters recognition) engine that is being used. To obtain a sufficiently accurate image of the word to analyse and to have more freedom in the choice of the OCR system the sampling constraint has however been observed. Considering the minimum stroke size (0.3 mm) and the sampling step required, a number of 250 dots per inch, that is 250 dpi, is needed. The minimum and maximum sizes of the text to be read have to be taken into account for the estimation of the resolution of the sensor. The instrument is designed to read texts in the usual printing size of the books or of the newspaper (head titles excluded). Imposing this constraint, it is possible to conclude that the length of the longest word of the dictionary ranges from four to six centimetres. Therefore, the sensor needs at least 600 columns (no restricting constraints are set for the rows because the height of the longest word is significantly lower than its length) and thereof a resolution of 640×480 pixels, or better 800×600 pixels, can be used.

Another pressing requirement of the acquisition system, and in particular of the lens, comes from the need to focus the image at a close distance (25-40 mm). Furthermore the camera should have a good sensitivity that results in a reduced exposure time and in a high images capturing rate, that is very important since the child could shake his hands or do fast movements when handling the pen. A related feature is the lens relative aperture (F-number on the camera optics), which have to be sufficiently high to obtain good acquisitions even indoors or in low lighting conditions. For this purpose, it is better to chose lens with low F values (<2.5), remembering that F changes inversely with the relative aperture. It is not required a high depth of field since the camera must be focused in a limited range of distances (few millimetres) from the printed sheet.

Another important parameter is the field angle and thereof the focal length and the sensor size. To establish the required field angle ($\alpha$), the area to be framed (D) and the distance of the lens (h) have to be taken into account (FIG. 2).

Supposing that the lens is located at 25-40 mm from the printed sheet and assuming that the framed area is of about 60-70 mm, the needed field angle ranges from 75° to 110° degrees.

Once the desired field angle is established, it is possible to evaluate the different cameras available on the market, their related focal length (f), and the sensor size (d), keeping in mind that the field angle $\alpha$ is:

$$\alpha = 2 \arctan(d/2f)$$

Another feature to be considered for the choice of the camera is the supply power and the absorbed current. The device can consume at least the maximum power provided by the USB standard, that is a +5V voltage and a 500 mA current.

Summarizing, the requirements for the acquisition system are:

Sensor type: CMOS for the low consumes and costs
Resolution: about 640×480 (300 k pixels)
Field angle: preferably ~90°
Sensitivity: low F (1.2-1.4 and surely <2.5)
Focal length: low, according to the sensor size, to obtain an high field of view (e.g. <2.4 mm with ⅓" sensors, <2 mm with ¼" sensors)
Size: reduced (<20 mm)
Power supply: preferably <5V
Power absorption: <50 mA (and surely <<500 mA)

As mentioned before, the device 1 is a system that helps the user in the reading of text printed on any support anyway placed in the space. The user, in a simple and natural manner, indicates the word to read and the system reproduces that word by means of vocal synthesis. The user can proceed forward to the next word or back to the previous one with great simplicity and controlling the reading rhythm. Unlike existing systems that require the scanning of the whole document or line of text and also an extreme positioning precision, the method here proposed allows the user to directly control an easy reading. This approach is particularly useful for the study when the reading rhythm must be tuned with the learning.

According to one embodiment shown in FIG. 1, the device 1 is composed by the following elements:

A peripheral 10 suitable for being fastened to a common pen or pencil 20 and equipped with a mini camera 12 and a standard fast communication interface;

A common processing unit 14, like a personal computer, a PDA or a smart phone, etc;

A communication channel (wired or wireless) 16 between the peripheral 10 and the computer 14;

A device for the reproduction of the voice 18;

Software for the peripheral management, the text recognition, the speech synthesis and the user interface.

The user grasps the pen 20 on which the peripheral 10 is mounted and leans the tip of the pen 20' near the word 30 to be read. The peripheral 10 sends, in real time, the sequence of framed images to the processing unit 14. The processing unit automatically detects when the user stopped under the text, recognizes the word the user wants to read and then reproduces it by means of the speech synthesis. To make the reading more fluent, the system can be set up to recognize a group of consecutive words near the pointer. For example, the prepositions and the articles can be joined with the subsequent word as well as short words can be joined together. Furthermore, the system can alert the user with a sound or a vibration when the word has been recognized, giving to the user the possibility to point the pen on the next word, while the system reproduces the current one.

Figure 3:
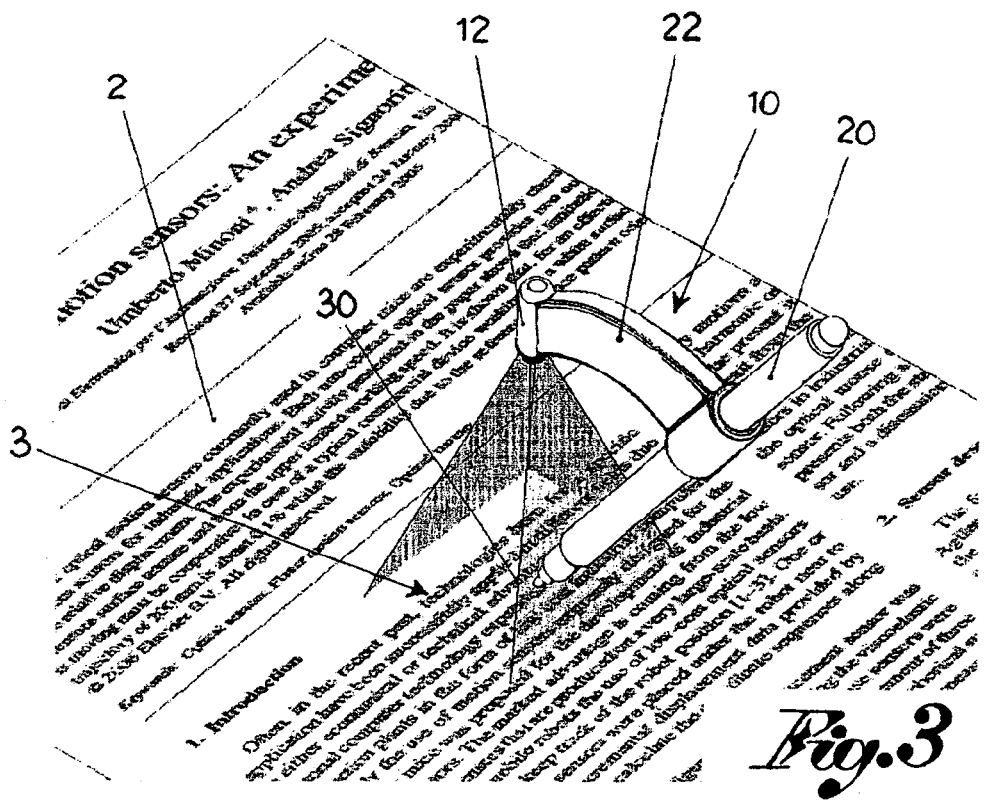
FIG. 3 shows the image acquisition peripheral, where the images come from a portion of printed text.

Referring to FIG. 3, the acquisition peripheral 10 includes a mini camera 12 integrated in a mechanical support 22 suitable for being fastened to a common pen or pencil 20. The tip 20' of the pen is rested close to the word being read 30 printed on a generic sheet 2. The camera is equipped with a VGA resolution CMOS sensor, a lens and a microprocessor that manages the communication and the transfer of the framed images to the processing unit 14.

According to one embodiment, the communication interface is the USB 2.0, due to its capability to supply the device and to guarantee a high data transfer speed. It is also a standard interface available on all personal computers and on most of PDA and smart phones. An evolution could be the use of the USB Wireless (or WUSB) that combines the high transfer speed of the USB 2.0 standard with the practicality of the Wireless technology; the drawback is the need of a separate power supply for the device.

The attachable support 22 is an ergonomic appendix of small size that integrates the camera 12 and the needed circuits. The appendix is mounted on the pen 20 handled by the user and does not encumber the grip or affect the view of the text to be read.

According to one embodiment, the peripheral 10 is connected to a traditional computer (personal computer or notebook) or to a new generation portable computer (PDA or smart phone) through the chosen interface. In this way the software for the processing of the images, the text recognition, the speech synthesis and the user interface is executed on the computer without the need to implement it in hardware on the device, thus gaining flexibility and changeability.

The acquisition and recognition software manages the communication between the computer 14 and the peripheral 10, processes the framed images, recognizes the pointed text and reproduces it by means of the speech synthesis. The software also implements the user interface and allows the configuration of several parameters (e.g. the recognition language, the synthesis voice, etc.), which customize the use of the device.

The system architecture together with the developed algorithms make the word recognition robust with respect to:

The orientation and position of the pen near the text,

The type of the character of the text,

The size of the text (within reasonable limits dependent on the optics),

The small user's hand shakings or movements,

The lighting conditions and the other troubles caused by shadows or optic aberrations.

According to one embodiment, the developed software is divided in two main independent modules:

Module for the pre-processing 40 of the sequence of images framed by the camera: this software receives the images from the camera, analyses them to establish when the user stopped near the word to read and executes some pre-processing operations, like binarization.

Module for the words processing 50: receives the frames filtered by the previous module, analyses them and reproduces the word/s recognized by the means of speech synthesis.

When the program starts, the first module 40 receives the frames from the camera, analyses their sequence and when detects that the image is motionless, raises an event to alert the second module 50 that a new image is ready. The second module captures this event, processes the frame, extracts the pointed word/s and starts the vocal reproduction.

Advantageously, the two modules are executed as two parallel threads and the processing of the selected frames is carried out in real time, namely at "frame-time", that is the time between the acquisition of two consecutive frames. Therefore, the user does not feel any delay due to the image processing while reading the text.

An execution flow chart of the pre-elaboration module 40 is shown in FIG. 4. Starting with the execution of the application, which communicates with the camera connected to the host computer through a USB interface, the module receives the frames provided by the camera 12. According to one preferred form of implementation that enable to make the algorithm more computationally efficient, the module 40 first transform each acquired frame in grey scale. Then the module compares the acquired frame with the n (n>=1) frames previously acquired and calculates the movement level, as an example by using a motions detection algorithm. When the module realizes that the user has stopped the pen it binarizes the current frame and passes this frame to the word extraction module 50. In this phase the algorithms of motion detection and of binarization are of great importance. The motion detection algorithm is crucial since it determines when the image is steady and therefore the instant to start the image processing and word recognition. It is therefore necessary that the motion detection be carried out both accurately and in a computationally efficient way. The binarization algorithm is also important since the success of the following phases of word extraction and word recognition strictly depends on the good binarization. Moreover, also for the binarization, the computation efficiency is mandatory since the processing must be done respecting the frame rate constraint (40 ms at 25 fps).

For this reason an accurate study and a number of experiments aimed to find the best solutions have been carried out. For the algorithm development it has been taken advantage of the knowledge of the specific characteristics of the images to elaborate, that is text images where the tip of the marker indicates the area where the word(s) to be read can be found. Taking advantage from this knowledge, it is possible to develop more effective algorithms, that, since they do not need to perform a blind analysis over the entire image, are lighter in terms of computation time.

The motion detection algorithm analyses the frame sequence acquired by the camera to automatically establish when the user has stopped the pen near the word to be recognized and consequently activate the subsequent elaboration of the current image. Each frame acquired by the camera is compared to the preceding one producing a value that quantifies the movement between the two subsequent images. The value is given by the percentage of pixels that undergo a significant variation (i.e. greater than a given threshold) passing from one frame to the subsequent one. When within the last n frames (with n>2, experimentally n=3 has been chosen) a decrease of the movement level has been detected and the level is less than a given threshold, then it is assumed that the image is steady. At this point the frame is binarized and sent to the module that searches and extracts the word to be recognized. In the same way when the movement level is greater than a given threshold, it is deduced that the user is moving the pen over the text. In fact it is clear that when the user is moving over the text, the frames acquired by the camera are continuously changing. In contrast, when the user is stopping near the word to be recognized, subsequent frames will be very similar to each other and will become identical when the user definitely stop the pen. From the analysis of the movement level of the frames sequence a good estimator of the velocity with which the user is moving over the text can be evaluated.

As an example, a sequence of six subsequent frames having the portion of image 3' near the tip 20' of the pen 20 is shown in FIG. 5 where the movement level of each frame measured with respect to its predecessor is also reported. As it can be noted, starting from frame number 2 there is a continuous lowering of the movement level down to frame number 5 that corresponds to the case of the user being stopped with the pen over the word to read. Frame number 6 shows, instead, a high movement level representing the situation in which the user moves again the pen.

To improve the performance of this algorithm some improvements have been introduced. First the comparison among the frames is carried out considering just a section of each frame, that near to the marker 24, that is the image of the tip of the pen. In this way the computation efficiency together with the accuracy of the movement detection are improved since the system focuses on the most interesting image portion.

Moreover, according to an advantageous form of implementation, two movement level thresholds have been introduced: one dynamic and one static threshold. The first one is used to establish when the image becomes steady following a movement state. The second threshold is used to establish if the user has restarted the movement after a stop. Experimentally it has been discovered that the first threshold is the most pressing: it is necessary to avoid false acknowledgments of steady images. The second threshold is less pressing: it must be guaranteed the insensitivity to the small movements caused, as an example, by the hands trembling during the user stop over the word to be read.

The binarization algorithm makes the transformation of an input image, as an example a grey level image, into a binary output image; the algorithm is the first important step of the textual image elaboration and of text recognition. This elaboration is aimed to separate the background areas from the areas containing the text characters: the accuracy of this separation determines the quality and the results of the successive elaboration phases.

Since, for the device according to the invention, the focus has been put on the textual images being acquired by the camera, the developed algorithms have been studied and optimised to manage this particular situation. The image segmentation can be easily performed if the acquired frames have a good contrast, a low noise level, and if the ambient lighting is uniform. In real situations, however, some aspects operate by complicating the tasks. An undoubted advantage of the camera with respect to the digital scanners is the portability together with the rapid acquisition of the images but, unfortunately, at the same time the image acquisition is carried out under less stringent and less favourable conditions. This situation introduces some degradation of the acquired frame quality such as noise, low contrast, shadows and unhomogeneities of the luminance of the background.

In summary the binarization algorithm must solve such problems and has to separate the text pixels from the background pixels in the most accurate way; in the same time the algorithm has to be computationally efficient. In fact, the requirement is for a real-time elaboration, more precisely a frame-time elaboration to guarantee a system response time well accepted by the user. The search for an optimal compromise between the binarization accuracy and the computation efficiency has guided the algorithm development and has inspired the introduction of the optimisations described in detail later on.

A number of binarization methods have been proposed in the last years, unfortunately a lot of them are suited just for high quality images coming from digital scanners, others are poor in terms of computation efficiency and more are too general and not well suited for the specific application. The binarization techniques are divided into global and local: in the first case a unique threshold for the whole image binarization is chosen, whilst in the second case a threshold for each pixel (or group of pixels) is chosen on the basis of local characteristics of the image area. It is evident that the algorithms of the first category are computationally light and efficient but present evident limitations in segmentation of images with varying luminance or presenting shadows or noisy areas.

Taking advantage from the knowledge of the application domain, the second approach has been chosen for the development of the binarization algorithms. In particular we start from the following hypothesis:

The binarization applies to textual images, that is to images where some text characters are printed over a background. Some non-textual elements can be present on the images, however these objects are rare and they are not relevant for the elaboration.

The intensity variations (i.e. the grey level changes) among the pixels of the image areas including text characters are significantly greater than that of the background areas. The background may present a non-uniform intensity, however the luminosity gradient among adjacent pixels is surely less than we can find among the pixels of a text image area.

The marker, in other words the tip of the pen, is placed in a known position of the acquired image and the word to be recognized is above and near the marker. It is therefore useless the binarization of the entire image, but it is sufficient to concentrate the attention on a suitable area around the marker. The area to be considered is dynamically determined by the binarization algorithm, since the area varies as a function of the position and dimension of the word.

According to a preferred embodiment, before starting the binarization process, the image is filtered with a smoothing filter to lower the noise overlapped to the image itself. Then the algorithm proceeds as in the following.

Starting from an area near the marker position 24 the image is divided into bands 60 of predefined widths (experimentally a little bit more than the average character width). As it can be noted on FIG. 6, the image is ideally split in vertical bands starting from the central one that includes the marker 24, that is, the tip of the pen. The goal is to analyse each band independently from the others isolating the area containing the characters around the marker and then to compute the local binarization threshold for this image block. The bands are analysed and scanned starting from the central one containing the marker and then proceeding towards the right and left sides up to the image borders.

Referring to FIG. 7, for each band 60 and starting from the line 61 coinciding with the marker height 24, the intensity gradient (grey level) of each pixel for each line is analysed first going up and than down along the image.

The intensity gradient is defined as the maximum variation of a colour level, for example the grey, from one pixel and the adjacent pixels along the four vertical and horizontal directions. Here the oblique directions have been neglected in order to reduce the number of calculations and the computational time required by the algorithm. Intuitively we can think that on the border between a character and the background the intensity gradient is high and surely higher than the gradient we can measure between pixels both belonging to the same character or to the background. Therefore by analysing one row of pixels inside a band, in case we encounter significant intensity gradient variations, we can deduce that the row passes through a portion of image including some text. On the contrary, it can be easily concluded that the row belong to a portion of image containing just the background. We proceed in this way for each row of the band applying the following decision criteria:

If the parsed row contains text we proceed with the following row.

If, after some text rows, we find n consecutive rows that do not contain text we conclude that the character is ended and we stop.

Otherwise if we do not find any text rows for a given number of rows we conclude that the analysed portion of image does not contain text and we classify the block as background, that is we assign the colour chosen to represent the background to all the pixels of the block.

From this analysis we exclude the pixels belonging to the marker (i.e. belonging to the pen or pencil).

Figure 8:
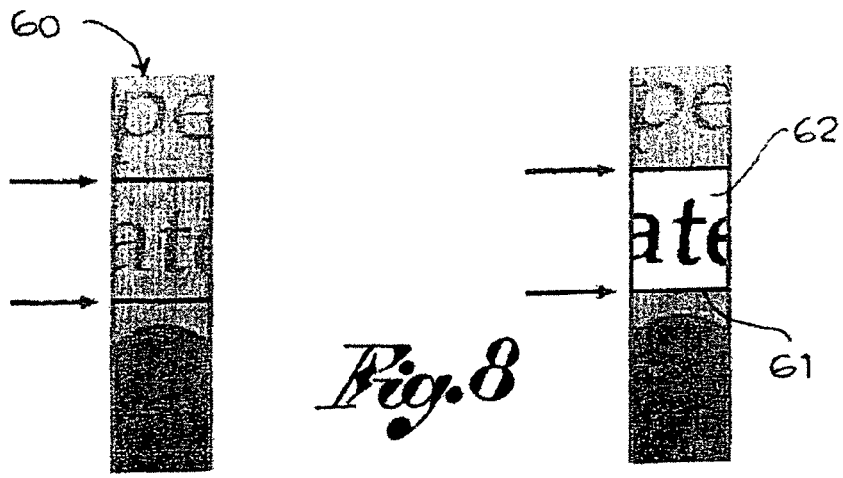

In this way and as shown in FIG. 8, for each band 60, we identify one upper and one lower limit that edge the portion of the image 62 containing the text to binarize. If the block just defined has been classified as background no more operation is carried out. Otherwise if the block has been classified as containing text, it is binarized by using, as an example, an algorithm combining the statistical method proposed by Otsu with a method based on the peak intensity search inside the histogram of the block.

To improve the accuracy of the block classification and to manage the cases were the text slope is very high, some further heuristics that define a minimum height h and a maximum height H for each considered band have been introduced. In other words we proceed by scanning the band rows for at least h rows and at a maximum of H rows. The values of h and H are defined as a function of the text block height we find in the previous considered band (experimentally it has been found that h is about 85% of the height of the previous block and that H is about 150% of the height of the previous block). In summary, if a text row is not found within h analysed rows we conclude that the block is a background block, in the same way if some text is found also beyond H analysed rows we stop anyway to avoid the binarization of the overall image. This second heuristics based on the maximum height of the block is very useful when the text is included in a grid because it makes it possible to avoid the binarization of the overall image.

Figure 9:
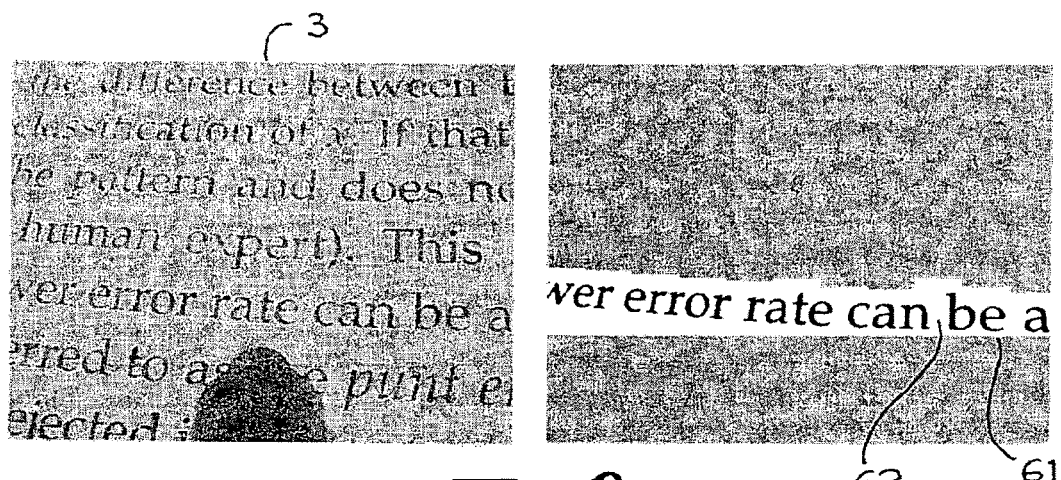
Figure 10:
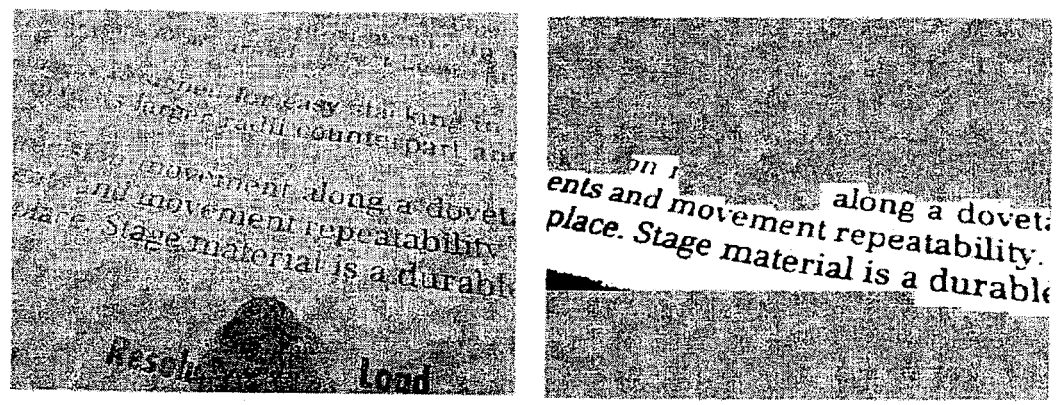

As it can be seen in FIG. 9, where the areas not analysed are greyed, the binarization algorithm is applied just to a portion of the image containing text around the marker. In this way the elaboration time is drastically reduced and the subsequent phases of word extraction are simplified. Referring to FIG. 10, in some cases the binarization extends for a greater portion of text, however the examined area is always far less than the entire image.

Figure 11:
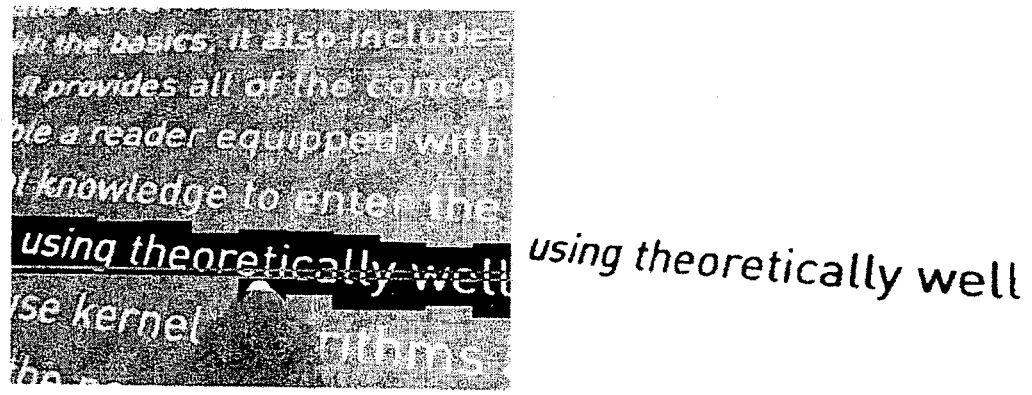
FIG. 11 shows an example of inverse binarization.

The algorithm effectively manages also the images where the text is light over a dark background: as it can be seen in FIG. 11, after a first binarization of the considered blocks, a suitable band of pixels around the marker are examined and if the percentage of black pixels is greater than that of white pixels the final image is inverted. In fact, it is experimentally verified that, taking an area of the image including some text, the percentage of the background pixels is greater than that of the character pixels.

Figure 12:
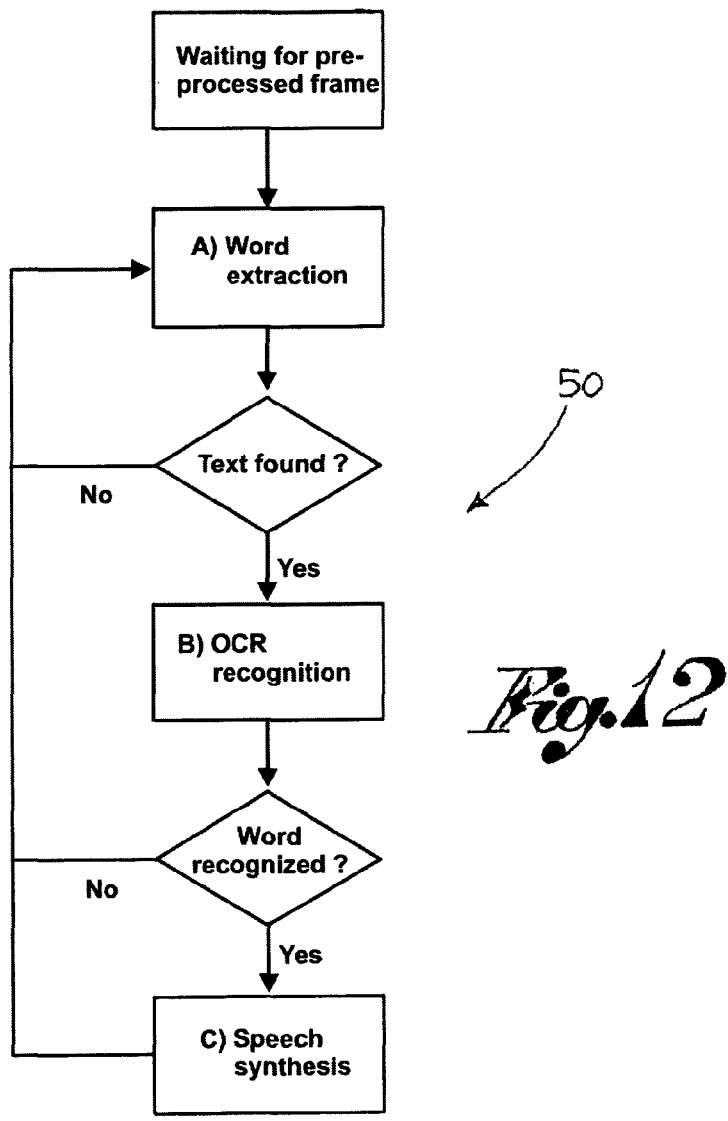
FIG. 12 is a flow diagram of the words extraction algorithm.

The flow diagram of the algorithm implemented by the words elaboration module 50 is shown in FIG. 12. This module receives the frames selected by the pre-elaboration module 40, analyses these frames and extracts the text to be recognized and to be uttered. To reach that goal, starting from the binarized image, the module performs a connectivity analysis to identify and classify the "blobs" 70 included in the image. Given S the set of black pixels, we define "blob" the set of pixels∈S (belonging to S) connected one each other. Two pixels p,q∈S are connected to each other if a path from p to q made by just pixels∈S exists. Starting from the recognized blobs, the module extracts those corresponding to the line of text to be recognized; the module then isolates the wanted word, recognizes that word by the OCR (optical character recognition) and reproduces the word by a speech synthesis.

Figure 13:
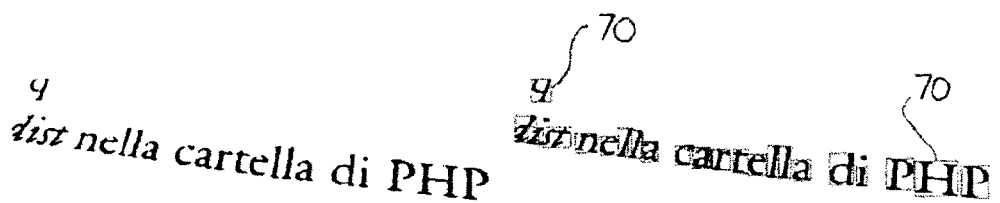

The algorithm that extracts the portion of the image containing the word to be recognized works on the binarized image through the following phases:

Connectivity analysis: it is aimed to the extraction of the image blobs 70. When this analysis is completed the blobs that seems to be too small are discarded and classified as noise. The results of this phase are shown in FIG. 13.

Figure 14:
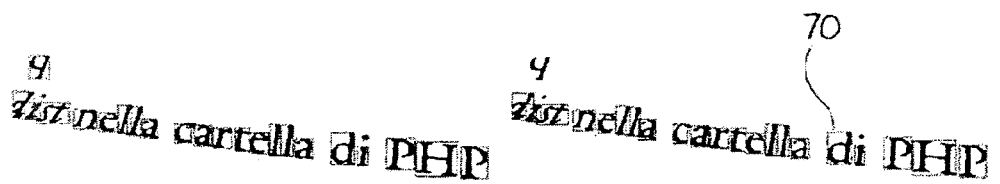

Coarse extraction of the line blobs: starting from the blob set and knowing the marker position the blobs 70 belonging to the text line to be recognized are extracted. The choice of the blobs to extract is based upon the spatial vicinity criteria and upon a blob classification guided by blob morphology and dimension investigation. The results of this phase are shown in FIG. 14.

Figure 15:
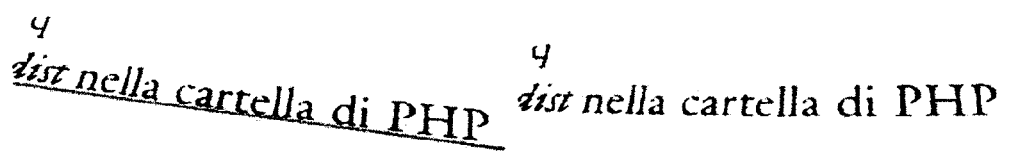

According to an advantageous form of the algorithm implementation, the text slope is calculated, as an example by a linear interpolation of the centres of the blobs representing the characters of the text line. If the calculated slope is of a given value, the image is rotated to correct that inclination in such a way that the text line to be recognized becomes horizontal (FIG. 15).

Fine line blob extraction: when the image is aligned, the text line blobs 70 are extracted in a finer and more sophisticated manner than that of the coarse extraction. In particular the near blobs belonging to the same character (i.e. those from accents or tittles of "i") are merged together. As shown in FIG. 16a, the goal of this phase is to accurately extract the character blobs of the line text to be recognized.

Word blobs extraction: referring to FIG. 16b, from the set of text line blobs just the blobs of the central word 30 that is pointed by the user are extracted. To reach the goal, an analysis of the spacing among the character blobs is carried out to identify where the word spacing are placed. According to one form of implementation, the algorithm extract not only the pointed word but also the n−1 words preceding the pointed word, of course if they are included in the image.

Extraction of the image portion containing the word: at this point and as shown in FIG. 17, known the word blobs, the portion of the image that includes them is extracted. That bitmap will be sent as input to the OCR module for the acknowledgment.

When the portion of the image that includes the word pointed by the user has been extracted, the OCR software is executed providing as its output the recognized text string. The elaboration and filtering operations of the previous steps greatly simplifies the OCR work that, receiving a clear and well-aligned binary image, has just to classify the characters.

The final elaboration phase consists of the speech synthesis of the recognized word. According to one embodiment of the device, the Microsoft Speech API 5 installed with the operating systems starting from Windows XP has been chosen. This API provided by Microsoft gives a standard programming interface that enables the integration of third parties speech synthesis engines into the user applications. The user application sends the speech synthesis commands to the SAPI 5 that activates the speech synthesis engine in a way transparent to the programmer.

To improve and make more flexible the recognizing system some optimisations have been introduced, such as the possibility of reading multiple words, the automatic management of the hyphenated words, and the composed reading of very long words.

To speed up and to make more fluent the reading process, the algorithm has been optimised in order to read not only the word pointed by the user but also to read the n preceding words (i.e. n=2). In this way the user can proceed more quickly with the reading avoiding stopping over each word but stopping just every two-three words. To this purpose, the word extraction algorithm has been modified to extract not only the pointed word but also the preceding ones (obviously if they are completely visible in the acquired frame). Also, the algorithm managing the speech synthesis has been modified by introducing some controls to avoid overlapping, missing or repeated words.

As far as the automatic managing of the hyphenation, the algorithm that sends the text to be reproduced to the speech synthesis engine has been modified to manage the automatic hyphenation in a way transparent to the user.

In fact, when the word to be recognized ends with the hyphenation sign "-" and no text appears on the right of the word along the current line, the system memorizes the portion of the recognized and wait to start the speech synthesis until the user reads the remaining word portion on the next line. If this happens in a reasonable time interval the system merges the two parts of the word and utters the reconstructed word. In this way the hyphenation is automatically and fluently managed.

As far as the reading of long words, if a word is too long or it is written with a large character font it may happen that the camera cannot frame the entire word. The system has been modified to recognize such a condition and to keep in memory the word sections until the entire word has been acquired. In this case the user points the same word at different positions and the system reconstructs the whole word by merging the subsequently acquired sections. To find the linking point between two word fragments and to establish if the two fragments have to be actually fused in one word, the algorithm compares the image of the last n characters of the first fragment with the first n characters of the second fragment. This analysis is carried out before the recognition by the OCR engine, and the comparison among the different characters is based on some suitably chosen parameters, such as the height/width ratio, the filling percentage, the centre of gravity and the inertia momentum of the character. If the algorithm finds a good matching between the character sequence of the first word fragment and the character sequence of the second fragment it proceeds with the fragments fusion.

A man skilled in the art, in order to fulfil particular requirements, may apply to the various embodiments of the device described above, any modifications, adaptations and substitutions of elements with other equivalent elements, without departing from the scope of protection as defined by the appended claims. Each of the characteristics described as belonging to one embodiment can be realized independently from the other embodiments described.

The invention claimed is:

1. Aiding device for reading a printed text, comprising:
a pointer which a user can manually move over the printed text;
a data acquisition peripheral comprising a camera mounted on the pointer;
a processing unit;
communication means between the data acquisition peripheral and the processing unit; and
a vocal reproduction device; wherein
said processing unit comprises
an image pre-processing module which is programmed to acquire a sequence of images framed by the camera, and to detect, by comparing said images, when the user has stopped on a selected word in the text, and
a word processing module which recognizes the selected word, and causes the vocal reproduction unit to reproduce the sound of the selected word,
wherein said peripheral is mounted on the pointer in a position such as to frame the selected word without impeding the user's view of the word and without hindering the pointer grip, and
the image pre-processing module compares sequential images, and when by doing so detects that the user has stopped on a word, automatically activates the word processing module without requiring further user input.

2. Device according to claim 1, in which the acquisition peripheral has an arm that can be fastened to a common pen or pencil acting as a pointer.

3. Device according to claim 1, in which the acquisition peripheral has a microprocessor that controls the communication and the transfer of the acquired images to the processing unit.

4. Device according to claim 1, in which the image pre-processing module is programmed to implement an algorithm for detecting the movement of the camera, comprising the following phases:
comparing a current image with a previous image,
calculating the percentage of pixels that have undergone a significant change between the images, and
comparing said percentage of pixels with a pre-established threshold value.

5. Device according to claim 4, in which the image pre-processing module implements a binarization algorithm suitable for separating, from the image, the background areas from the areas containing characters to transform the image selected by the movement detection algorithm into a binary output image.

6. Device according to claim 5, in which the binarization algorithm comprises the following steps:
splitting of the selected image into vertical bands of preset width at least equal to the mean width of the characters of a text to be read;
for each band, analyzing the maximum change in level of intensity between one pixel and the adjacent pixels in the four vertical and horizontal directions so as to establish whether each line of pixels of the band crosses a portion of image containing characters;
defining, for each band, a block of text, if the portion of image contains characters, or a block of background, if the portion of image does not contain characters;
converting the image of each block of text into a binary image so as to extract the characters contained in said block.

7. Device according to claim 6, in which the analysis of the vertical bands is done starting from and limited to one around the position of the pointer tip.

8. Device according to claim 1, in which the word processing module implements a word identification algorithm which performs a connectivity analysis of the binarized image so as to identify groups of pixels connected together, extract the groups of pixels that correspond to the characters of the line of text to be recognized, isolate the word of interest, make recognition by means of an algorithm for optical character recognition (OCR), and reproduce the word by means of vocal synthesis.

9. Device according to claim 8, in which the word identification algorithm extracts, from the groups of connected pixels, those that correspond to the characters of the line of text to be recognized using a principle of spatial closeness and according to the dimension and the morphology of said groups of pixels.

10. Device according to claim 9, in which the word processing module calculates the angle of the line of text to be recognized and, if the calculated angle is higher than a pre-established figure, turns the image until the line of text is in horizontal position.

11. Device according to claim 9, in which the word identification algorithm performs an analysis of the spacing of the groups of pixels relating to the characters with respect to the tip of the pointer, so as to extract from the line of text the characters of at least the pointed word.

12. Device according to claim 11, in which the word identification algorithm extracts the portion of image containing the characters of at least the pointed word and sends said portion of image to the optical character recognition algorithm (OCR).

13. Device according to claim 8, in which the word processing algorithm extracts from the selected frame and carries out the vocal synthesis not only of the pointed word but also of at least one previous word.

14. Device according to claim 8, in which, if the pointed word ends with a start of new paragraph character, the word processing algorithm stores the portion of recognized word, waits for the user to start a new paragraph and point the remaining part, links together the two parts and reproduces the word in its entirety.

15. Device according to claim 8, in which, if the pointed word has a length such as not to be completely framed by the camera, the word processing algorithm stores the portions of words framed in succession and, if the images of the last n characters of a portion correspond to the images of the first n characters of a subsequent portion, it links together said portions.

16. Device according to claim 1, in which the processing of the selected image is done in real time.

17. Device according to claim 1, in which the means of communication between the peripheral and the processing unit comprise a USB or WUSB interface.

18. Device according to claim 1, wherein the pointer has a pen-like body.

* * * * *